US006702584B2

(12) United States Patent
Ueshima et al.

(10) Patent No.: US 6,702,584 B2
(45) Date of Patent: Mar. 9, 2004

(54) KARAOKE DEVICE WITH BUILT-IN MICROPHONE AND MICROPHONE THEREFOR

(75) Inventors: Hiromu Ueshima, Shiga (JP); Kunihiro Tanaka, Shiga (JP)

(73) Assignee: SSD Company Limited, Shiga (JP)

( * ) Notice: Subject to any disclaimer, the term of this patent is extended or adjusted under 35 U.S.C. 154(b) by 196 days.

(21) Appl. No.: 09/935,198

(22) Filed: Aug. 23, 2001

(65) Prior Publication Data

US 2002/0031233 A1 Mar. 14, 2002

(30) Foreign Application Priority Data

Aug. 23, 2000 (JP) ....................................... 2000-006047

(51) Int. Cl.[7] .......................... G09B 15/04; G10M 1/36

(52) U.S. Cl. ............................ 434/307 A; 434/307 R; 84/610; 341/176

(58) Field of Search ............................ 434/307 R–309, 434/318, 365; 84/600, 609, 610, 602, 604, 634, 626, 657, 660, 478; 381/61, 111, 122, 83, 312, 314; 341/176, 173

(56) References Cited

U.S. PATENT DOCUMENTS

| | | | | | |
|---|---|---|---|---|---|
| 5,598,162 | A | * | 1/1997 | Terashima et al. | 341/176 |
| 5,606,143 | A | * | 2/1997 | Young | 84/600 |
| 5,649,019 | A | * | 7/1997 | Thomasson | 381/83 |
| 5,684,261 | A | * | 11/1997 | Luo | 84/609 |
| 6,025,553 | A | * | 2/2000 | Lee | 84/610 |
| 6,147,291 | A | * | 11/2000 | Matsumoto | 84/611 |
| 6,166,315 | A | * | 12/2000 | Kitano | 84/610 |
| 6,267,600 | B1 | * | 7/2001 | Song | 434/307 A |
| 6,520,776 | B1 | * | 2/2003 | Furukawa | 434/307 A |

FOREIGN PATENT DOCUMENTS

| | | | |
|---|---|---|---|
| JP | 8-16180 | * | 1/1996 |

* cited by examiner

*Primary Examiner*—Joe H. Cheng
(74) *Attorney, Agent, or Firm*—Arent Fox Kintner Plotkin & Kahn, PLLC

(57) ABSTRACT

A karaoke device with built-in microphone includes a main body microphone, and converts an audio signal from the microphone into audio data by an A/D converter, and writes the audio data into a ring buffer by mixing with the data already stored in the ring buffer. If an echo mode is set, a delay time constant ($C_D$) corresponding to the echo mode is determined, and on the basis thereof, a size of the ring buffer is set. The data is read from the ring buffer, and is inputted in a sound channel. If a voice effect mode is set, a reproduction frequency constant ($C_F$) corresponding to the voice effect mode is determined, and based thereon, an inclement value of a read pointer of the ring buffer is determined, and then, the data is read from an address indicated by the read pointer. When the read pointer reaches the delay time constant, the relevant constant is subtracted from the read pointer value. Furthermore, it becomes possible to simultaneously use a microphone of an additional microphone and the main body microphone by inserting a microphone plug of the additional microphone into a microphone jack of the karaoke device.

5 Claims, 9 Drawing Sheets

FIG. 9

EXAMPLE CONSTANT TABLE OF ECHO MODE/VOICE EFFECT MODE

| MODE \ CONSTANT | CONSTANT $C_M$ CONTROLLING MIXING RATE | CONSTANT $C_D$ CONTROLLING DELAY TIME | CONSTANT $C_F$ CONTROLLING VOICE REPRODUCING FREQUENCY |
|---|---|---|---|
| ECHO MODE 1 (DELAY : SMALL) | 0. 5 (50%) | SMALL | 1. 0 (100%) |
| ECHO MODE 2 (DELAY : MIDDLE) | 0. 5 (50%) | MIDDLE | 1. 0 (100%) |
| ECHO MODE 3 (DELAY : LARGE) | 0. 5 (50%) | LARGE | 1. 0 (100%) |
| VOICE EFFECT MODE 1 (FREQUENCY VARIATION : HIGH-TONE) | 0. 75 (75%) | MINIMUM | 2. 0 (200%) |
| VOICE EFFECT MODE 2 (FREQUENCY VARIATION : LOW-TONE) | 0. 75 (75%) | MINIMUM | 0. 5 (50%) |
| VOICE EFFECT MODE 3 (FREQUENCY VARIATION : SWEEP) | 0. 75 (75%) | MINIMUM | VARIED ALONG WITH TIME WITHIN RANGE OF 0.75≦CF≦1.25 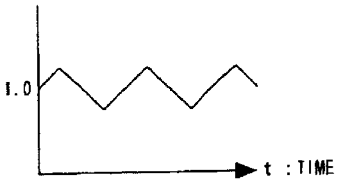  |

KARAOKE DEVICE WITH BUILT-IN MICROPHONE AND MICROPHONE THEREFOR

BACKGROUND OF THE INVENTION

1. Field of the Invention

This present invention relates to a karaoke device with built-in microphone and karaoke microphone therefor. More specifically, this invention relates to a karaoke device with built-in microphone, and more particularly, to a novel karaoke device with built-in microphone which accommodates a high speed processor incorporating a sound processor in a microphone body, and processes voices inputted from the microphone by the high speed processor, and to an additional microphone for karaoke device with built-in microphone with built-in microphone, in which a microphone plug of the additional microphone into a microphone jack of the karaoke device with built-in microphone, if required, a microphone plug of another additional microphone into a microphone jack of the additional microphone, thereby render all microphones available simultaneously.

2. Description of the Prior Art

Karaoke devices with built-in microphone have already been put in practical use. In conventional karaoke devices with built-in microphone, a karaoke reproduction device was mounted in a microphone body, and karaoke (music) was reproduced by the karaoke reproduction device, and singing voices in tune with the karaoke are inputted from the microphone. However, in the conventional karaoke devices with built-in microphone, it was not possible to process the singing voices inputted from the microphone.

Furthermore, in the past, when singing a duet song, for example, two microphones were made available simultaneously by inserting each microphone plug of the two microphones into two microphone jacks of the main body.

In conventional karaoke devices, the number of microphones to be used simultaneously were restricted by the number of microphone jacks provided in the main body. Therefore, when it was intended to use as many microphones as possible, it was not possible to accept this request.

SUMMARY OF THE INVENTION

Therefore, it is a primary object of this present invention to provide a novel karaoke device with built-in microphone It is another object of this present invention to provide a novel karaoke device with built-in microphone capable of processing voices inputted from a microphone.

It is still another object of this present invention to provide a novel karaoke microphone capable of using numerous microphones simultaneously.

A karaoke device with built-in microphone according to this present invention, comprises: a body having into which a microphone is mounted; an A/D converting means which is provided in the body, and converts inputted voices from the microphone into audio data; an audio data processing means which is provided in the body and receives the audio data from the A/D converter and processes the audio data to output processed audio data; and an audio signal outputting means which is provided in the body and outputs an audio signal on the basis of the processed audio data.

According to this present invention, the voices inputted into the microphone are converted into the audio data by the A/D converting means, and the audio data is processed by the audio data processing means. When the processed audio data is outputted by the audio signal outputting means. Therefore, a sound which is obtained by processing the inputted voices from the microphone can be outputted.

In one aspect of this present invention, the audio data processing means includes a ring buffer for storing the audio data from the A/D converting means; a writing means for writing the audio data in the ring buffer; and a reading means for reading the audio data from the ring buffer.

In this aspect, the audio signal from the microphone is converted in the audio data ($D_{IN}$) by the A/D converting means. The audio data ($D_{IN}$) is mixed with previous audio data ($D_{N-1}$) at a predetermined mixing rate ($C_M$), and is written in the ring buffer as the audio data ($D_N$). This is, the data ($D_N$) is written into an address indicated by a write pointer of the ring buffer.

In a preferred embodiment of this present invention, the karaoke device with built-in microphone further comprises an echo mode setting key provided on the body to set an echo mode, wherein the writing means includes a first setting means to set a size of the ring buffer in response to the echo mode.

In this embodiment, if the echo mode is set by the echo mode setting key, for example, the writing means sets a constant ($C_D$) representing a delay time, i.e. a size of the ring buffer. Then, when the write point reaches the constant ($C_D$), the write pointer is initialized. As a result, an echo is added to the inputted voices from the microphone.

In a preferred embodiment of this present invention, the karaoke device with built-in microphone further comprises a voice effect mode setting key provided on the body to set a voice effect mode, wherein the reading means includes a second setting means to set a ring buffer read pointer in response to the voice effect mode.

In this embodiment, if the voice effect setting key is operated by a user, for example, and the voice effect mode is set, the reading means determines a constant ($C_F$) controlling a reproduction frequency, and evaluates an increment value of the read pointer of the ring buffer according to the constant ($C_F$), and the read pointer is incremented. Then, when the read pointer reaches the previous constant ($C_D$), the constant ($C_D$) is subtracted from the read pointer.

Therefore, voice effect is applied to the voices from the microphone.

Furthermore, a karaoke microphone according to this present invention is a karaoke microphone provided with a microphone, a microphone jack and a microphone plug. The microphone jack includes a first jack terminal, a second jack terminal and a third jack terminal, and the microphone plug includes a first plug terminal, a second plug terminal and a third plug terminal. Both the second jack terminal and the second plug terminal are connected to an audio signal line for outputting an audio signal from the microphone, and both the third jack terminal and the third plug terminal are connected to a ground line.

According to this present invention, the first plug terminal, the second plug terminal and the third plug terminal of a second karaoke microphone are connected to the first jack terminal, the second jack terminal and third jack terminal of a first karaoke microphone by inserting the microphone plug of the second karaoke microphone into the microphone jack of the first karaoke microphone. The audio signal from a first microphone provided in the first karaoke microphone and the audio signal from a second microphone of the second karaoke microphone inputted in the first karaoke microphone through the second jack terminal of the first karaoke microphone are mixed each other by a mixer provided on the audio signal line, and a mixed audio signal is outputted from the second plug terminal of the first karaoke microphone.

In one embodiment of this present invention, if the microphone plug of the second karaoke microphone is inserted into the microphone jack of the first karaoke microphone, a microphone power is applied to the second karaoke microphone through the first jack terminal of the first karaoke microphone and the first plug terminal of the second karaoke microphone.

In a similar manner, if the microphone plug of the second karaoke microphone is inserted into the microphone jack of the first karaoke microphone, a terminating resistor having been connected to the second jack terminal of the first karaoke microphone is released, and both of the microphone of the first karaoke microphone and the microphone of the second karaoke microphone are terminated by the terminating resistor of the second karaoke microphone.

Furthermore, in a case that the first karaoke microphone is a karaoke device with built-in microphone, the audio processing means is incorporated in the karaoke device with built-in microphone, and a mixed audio signal is processed therein. Therefore, there is no need to provide a microphone plug in the karaoke device with built-in microphone. By inserting a microphone plug of a further additional microphone into the microphone jack of such the karaoke device with built-in microphone, it becomes possible to simultaneously use two microphones. By inserting the microphone plug of another additional microphone into the microphone jack of the additional microphone, it then becomes possible to simultaneously use three microphones in total. In a similar manner, by connecting additional microphones in series, it becomes possible to arbitrarily increase the number of microphones to be used simultaneously.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is an illustrative view showing an example of a constant table for voice processing.

DETAILED DESCRIPTION OF THE PREFERRED EMBODIMENTS

Figure 1:
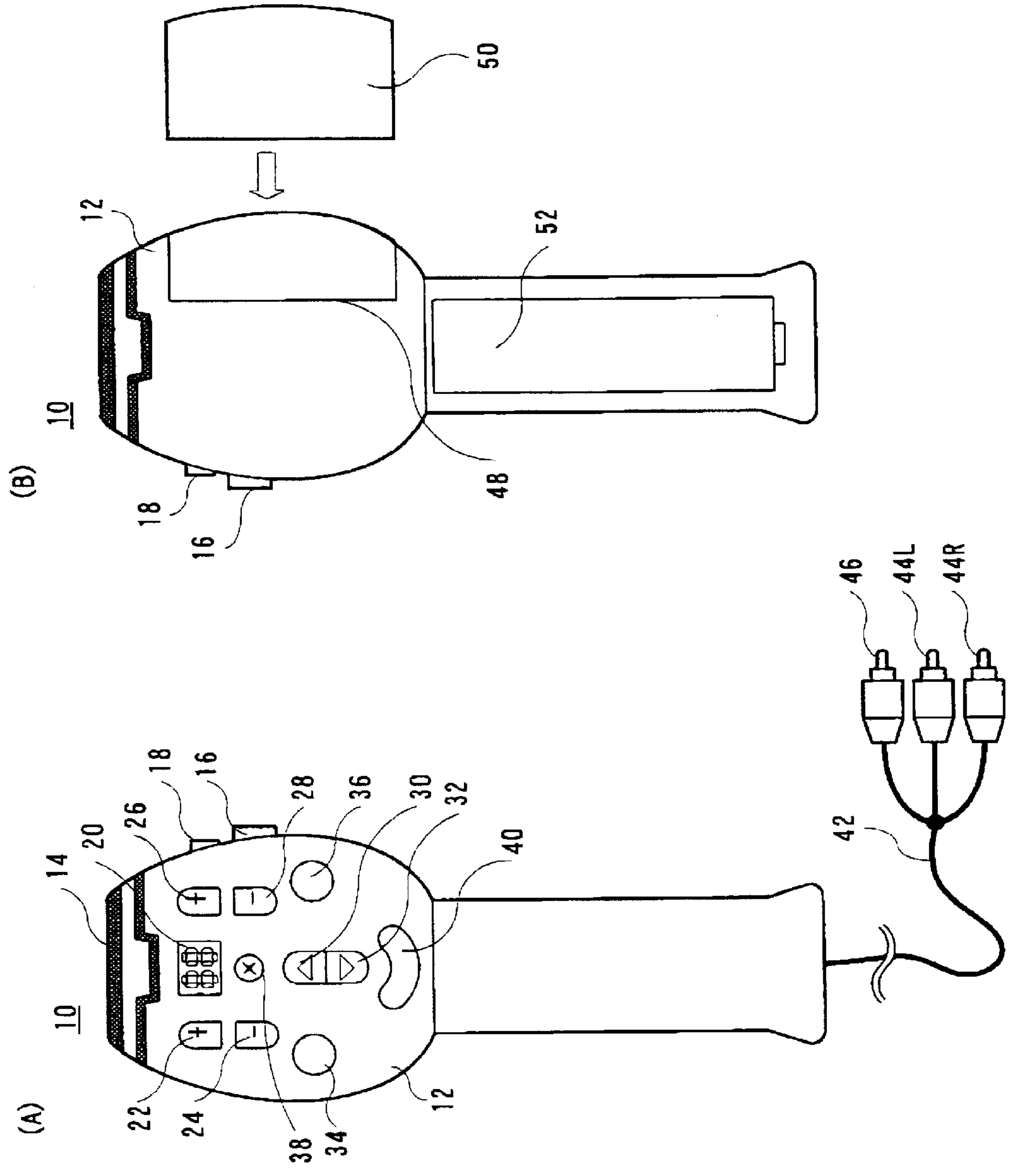
FIG. 1 is an illustrative view showing structure of a karaoke device with built-in microphone of one embodiment according to this present invention, FIG. 1(A) showing a front surface, FIG. 1(B) showing a rear surface.

A karaoke device with built-in microphone 10 according to one embodiment of this present invention shown in FIG. 1 includes a body 12 having an egg-shaped upper portion and a cylindrical lower portion, and a microphone 14 is mounted at an upper end of the egg-shaped portion of the body 12. It is pointed out in advance that the karaoke device with built-in microphone 10 of this embodiment functions not only as a karaoke device main body to process a karaoke (BGM), microphone voices, and video images but also as a karaoke microphone.

On an upper portion of the body 12, i.e. the egg-shaped portion, a power switch 16 and reset switch 18 are provided. The power switch 16 is a switch for turning on/off a power, and the reset switch 18 is for resetting a whole process including selected music number.

Furthermore, a display 20 formed of a two-digit segment LED is provided on the egg-shaped portion, and on a left side that sandwiches the display 20 tempo control keys 22 and 24 are provided in an aligned fashion in a vertical direction, and on a right side BGM volume control keys 26 and 28 are provided in an aligned fashion in a vertical direction. The display 20 is utilized to show a music number selected by a user. The tempo control keys 22 and 24 are keys for increasing or decrease a reproduction speed (tempo) of the karaoke or BGM. The BGM volume control keys 26 and 28 are keys to increase or decrease a reproduced sound magnitude (volume) of the karaoke or BGM.

Music selection/pitch control keys 30 and 32 are provided at a center, slightly lower portion of the egg-shaped portion of the body 12. The music selection/pitch control keys 30 and 32 are utilized to increment or to decrement a music number, and also utilized to raise or lower a karaoke pitch frequency, i.e. a tone in tune in accordance with the user's tone one tone by one tone, for example.

An echo mode selection key 34 is provided at a left of the music selection/pitch control keys 30 and 32 and below the tempo control key 22 and 24 on the egg-shaped portion of the body 12. The echo mode selection key 34 is utilized to selectively set an echo time (delay time) in an echo mode. In this embodiment, it is possible to set echo mode 1, echo mode 2 and echo mode 3 and the echo time is set as "small", "medium" and "large", respectively.

A voice effect mode selection key 36 is provided at a right of the music selection/pitch control keys 30 and 32 and below the BGM volume control keys 26 and 28 on the egg-shaped portion of the body 12. The voice effect mode selection key 36 can set voice effect mode 1, voice effect mode 2 and voice effect mode 3 in this embodiment. The voice effect mode 1 is a mode for processing voices so as to raise a frequency of output voices with respect to a frequency of the input voices, and the voice effect mode 2 is a mode for processing voices so as to lower a frequency of output voices with respect to a frequency of input voices. Furthermore, the voice effect mode 3 is a mode for processing voices so as to repeatedly change (sweep) a frequency of output voices continuously upward and downward.

A cancellation key 38 is provided between the display 20 and the music selection/pitch control keys 30 and 32. The cancellation key 38 is a key for canceling the tempo set by the tempo control keys 22 and 24, the BGM volume set by the volume control keys 26 and 28, the music number and the pitch set by the music selection/pitch control keys 30 and 32, the echo mode set by the echo mode selection key 34, and the voice effect mode set by the voice effect mode selection key 36. The cancellation key 38 is also used to suspend a music being played.

A determination key 40 is provided below the music selection/pitch control keys 30 and 32. The determination key 40 is a key for determining and validating the tempo set by the tempo control keys 22 and 24, the BGM volume set by the volume control keys 26 and 28, the music number and the pitch set by the music selection/the pitch control keys 30 and 32, the echo mode set by the echo mode selection key 34, and the voice effect mode set by the voice effect mode selection key 36.

An AV code 42 is withdrawn from a lower portion of the body 12, i.e. from a lower end of the cylindrical portion, and the AV code 42 includes two audio output terminals 44R and 44L and one video output terminal 46. The audio output terminals 44R and 44L and the video output terminal 46 are connected to an AV terminal of a home television (not shown). Therefore, the images or videos and the voices of the karaoke device with built-in microphone 10 in this embodiment are outputted on the home televisions. It is noted that when an audio circuit of the home television is not used, the audio output terminal 44R and 44L are connected to other audio devices such as a stereo amplifier or the like.

A cartridge connector 48 is provided on a rear surface of the body 12 as shown in FIG. 1(B), and a memory cartridge 50 is removably attached to the cartridge connector 48. It is possible to change a karaoke music and its mages by changing the memory cartridge 50.

In addition, the karaoke device with built-in microphone 10 in this embodiment is driven by batteries. Due to this, a battery box 52 is provided at the lower cylindrical portion of the body 12 as shown in FIG. 1(B).

Figure 2:
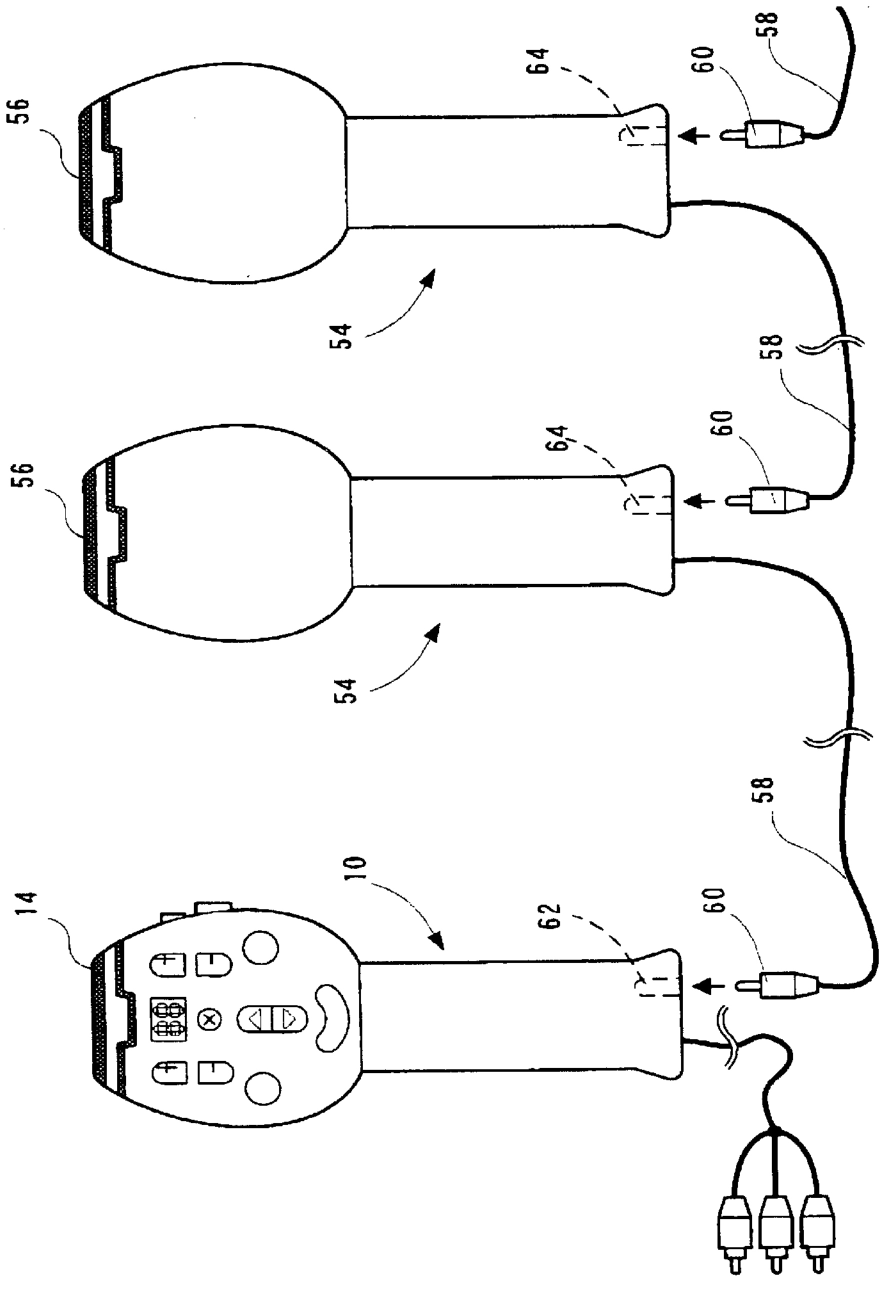
FIG. 2 is an illustrative view showing one embodiment according to this present invention.

As shown in FIG. 2, it is possible to connect more than one additional microphone 54 (in FIG. 2 example, 2 additional microphones) to such the karaoke device with built-in microphone 10. The additional microphones 54 shown in FIG. 2 are all identical, and include an upper egg-shaped portion and a lower cylindrical portion similar to the body 12 of the karaoke device with built-in microphone 10. At an upper end of the egg-shaped portion a microphone 56 is provided, and a connection code 58 is led-out from a lower end of the cylindrical portion. At a tip end of the connection code 58 a microphone plug 60 is provided. It is possible to insert the microphone plug 60 to a microphone jack 62 provided at an upper end of the cylindrical portion of the karaoke device with built-in microphone 10 or a microphone jack 64 provided at a lower end of the cylindrical portion of the additional microphone 54. That is, it becomes possible to use two microphones at the same time by connecting one additional microphone 54 to the main body, i.e. the karaoke device 10 by the plug 60 and the jack 62. Furthermore, it becomes also possible to use three microphones simultaneously by connecting another additional microphone 54 to the additional microphone 54 by the plug 60 and the jack 64. Still furthermore, it is possible to increase infinitely the number of microphones to be simultaneously used when connecting a further microphone 54 to additional microphone 54 by the plug 60 and the jack 64 in a similar manner. Therefore, unlike conventional karaoke devices, no limit is imposed in regard to the number of microphones to be simultaneously used.

Figure 3:
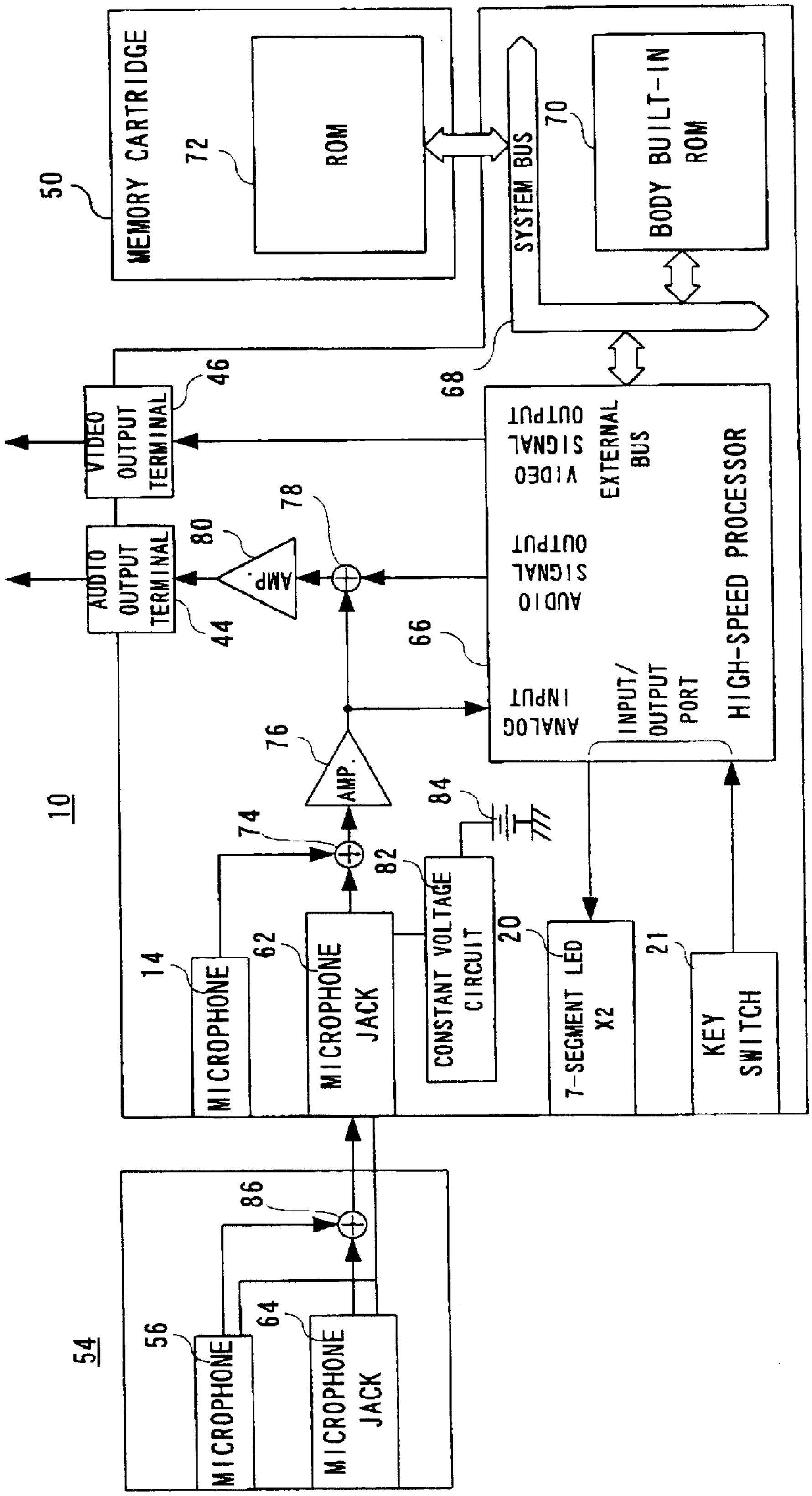
FIG. 3 is a block diagram showing internal structure of the FIG. 2 embodiment.

Referring to FIG. 3, the karaoke device with built-in microphone 10 in this embodiment includes a processor 66 accommodated inside the body 12. An arbitrary kind of processor can be utilized as the processor 66; however, in this embodiment a high-speed processor (product name "XaviX") developed by the applicant of the present invention and already filed as a patent application is used. This high-speed processor is disclosed in detail in Japanese Patent Laying-open No.10-307790 [G06F 13/36, 15/78] and U.S. patent application Ser. No. 09/019,277 corresponding thereto.

Although not shown, the processor 66 includes various processors such as a CPU, a graphics processor, a sound processor, and a DMA processor and etc., and also includes an A/D converter used in fetching an analog signal and an input/output control circuit receiving an input signal such as a key operation signal and an infrared signal and giving an output signal to external devices. The CPU executes a required operation in response to the input signal, and gives results to the graphics processor and the sound processor. Therefore, the graphic processor and the sound processor execute an image processing and an audio processing according to the operation result.

A system bus 68 is connected to the processor 66, and an internal ROM 70 mounted on a circuit board (not shown) which is accommodated within the body 12 together with the processor 66 and an external ROM 72 included in the memory cartridge 50 are connected to the system bus 68. Therefore, the processor 66 can access to the ROMs 70 and the 72 through the system bus 68, and can retrieve a video or image data and music data (score data for playing musical instruments) and so on.

As shown in FIG. 3, the audio signal from the microphone 14 is supplied to an analog input of the processor 66 through a mixer 74 and an amplifier 76. An analog audio signal which is a result of the processing the sound processor portion (FIG. 4) of the processor 66 is outputted to the audio output terminals 44 (44L, 44R) shown in FIG. 1 through the mixer 74 and the amplifier 76. Furthermore, an analog image signal which is a result of the processing the graphic processor (not shown) of the processor 66 is outputted to the video output terminal 46 shown in FIG. 1.

Furthermore, the karaoke device with built-in microphone 10 is provided with a microphone jack 62 that is a input terminal for an external microphone (shown in FIG. 2) in its body, and the microphone jack 62 fetches an audio signal from the additional microphone 54 outputted from the microphone plug 60 (FIG. 2) of the additional microphone 54. The audio signal from the additional microphone 54 inputted into the microphone jack 62 and the audio signal from the main body microphone 14 are mixed in the above described mixer 74, and inputted to the processor 66 from the amplifier 76.

Furthermore, display data is given from an output port of the processor 66 to the display 20 shown in FIG. 1, and all switches and keys shown in FIG. 1 (herein shown generally by reference number 21) are connected to an input port of the processor 66.

As shown in FIG. 2 a microphone jack 64 is provided on the additional microphone 54, and an audio signal from another additional microphone 54 is given to the microphone jack 64 through a microphone plug 60 (FIG. 2) of another additional microphone, and the audio signal from another additional microphone is synthesized with the audio signal from the microphone 56 provided in the additional microphone 54 by a mixer 86. Therefore, an audio signal mixed with audio signals of the two additional microphones is inputted into the microphone jack 62 of the main body 10. Due to this, an output of the mixer 74 becomes an audio signal that the audio signals of three microphones are mixed to each other.

Furthermore, a constant voltage circuit 82 is provided in the main body 10, and the constant voltage circuit 82 receives a battery output from the battery 84 accommodated in the battery box 52 (FIG. 1). The constant voltage circuit 82 supplies a constant voltage power which is obtained by stabilizing the output voltage of the battery 84 to circuit components such as the microphone 14 of the main body 10 and the microphone jack 62. Because the microphone plug 60 is inserted into the microphone jack 62 as described above, the constant voltage power from the constant voltage circuit 82 is also given to the microphone 56 of the additional microphone 54 as described later in detail. The power brought to the additional microphone 54 is also given to the microphone of another additional microphone connected via the microphone jack 64 and the microphone plug 60 as necessary.

Figure 4:
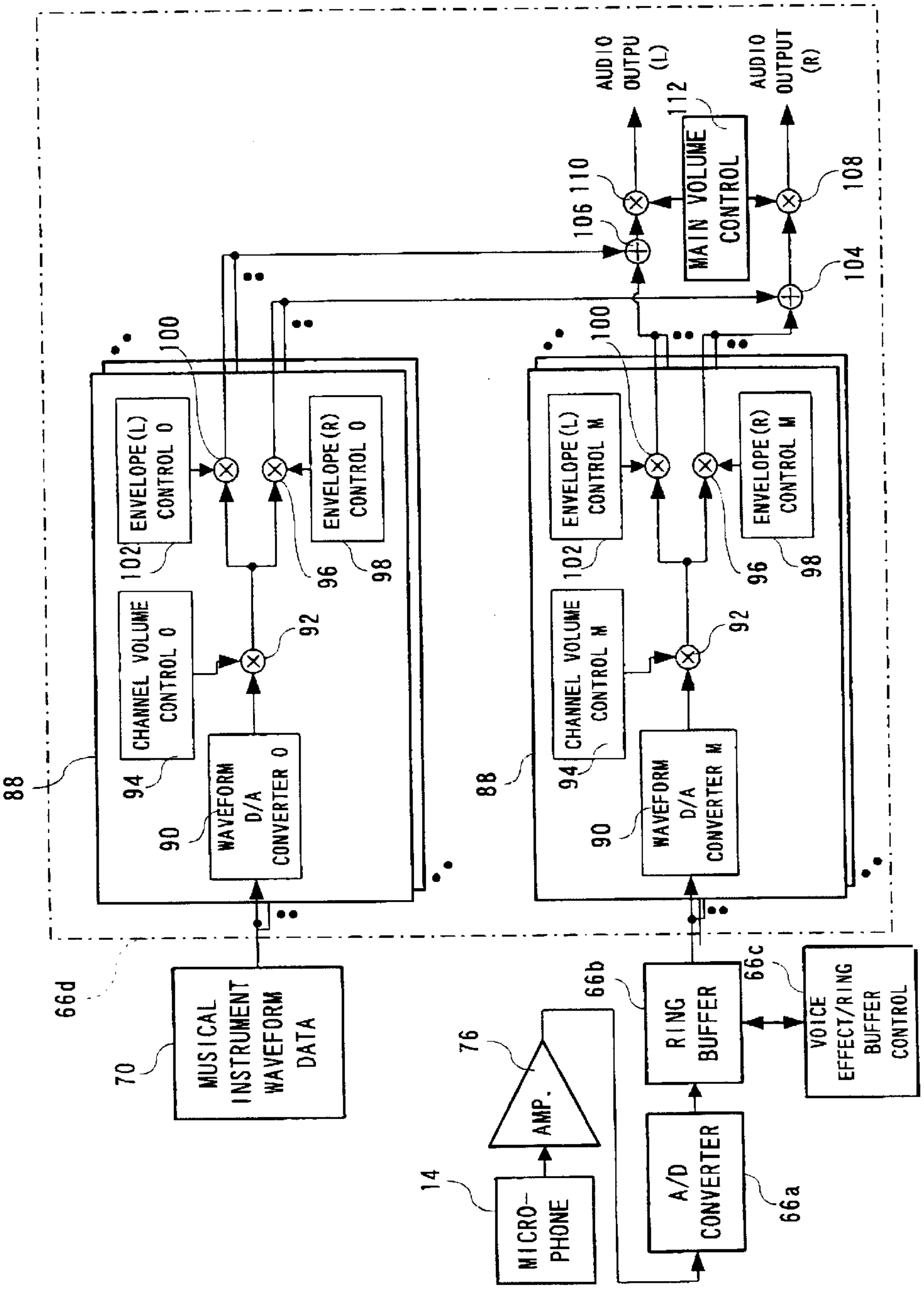
FIG. 4 is a functional block diagram showing a major portion of the karaoke device with-built in microphone.

Then, referring to FIG. 4 functionally showing a major portion of FIG. 3 as describe above, the audio signal (mixed audio signal) from the mixer 74 is supplied to the analog input terminal of the processor 66 (FIG. 2) via the amplifier 76. The processor 66 is provided with the A/D converter 66*a,* and the A/D converter 66*a* converts the analog audio signal into the audio data. The audio data is written into the ring buffer 66*b* formed of internal memories of the processor 66. The voice effect/ring buffer control means 66*c,* that is one of the functions of the CPU of the processor 66 controls a writing of the audio data into the ring buffer 66*b,* and also controls a reading of the audio data from the ring buffer 66*b*.

In the sound processor portion 66*d* of the processor 66, a plurality of sound channels 88 is formed. Each sound channel 88 includes a D/A converter 90 for converting audio waveform data into an analog audio signal, and the audio signal outputted from the D/A converter 90 is inputted to a multiplier 92, and the multiplier 92 controls a volume (amplitude) of the audio signal in response to a control signal of a channel volume control means 94, that is one of the functions of the CPU of the processor 66.

The audio signal volume-controlled by the multiplier 92 is inputted to multipliers 96 and 100, respectively. Similar to the multiplier 92, the multipliers 96 and 100 are for volume-controlling the audio signal. It is noted that in this embodiment the multiplier 96 controls an envelope of the audio signal (R) in response to a control signal from an envelope (R) control means 98, that is one of functions of the CPU of the processor 66. The multiplier 100 also controls a envelope of the audio signal (L) according to a control signal from the envelope (L) control means 102, that is one of functions of the CPU of the processor 66.

In FIG. 4 embodiment, N sets of sound channels 88 of are utilized to process inputted voices from the microphone 14. Furthermore, M sets of sound channels 88 are utilized to process the musical instrument waveform data for the BCM (karaoke) set in advance in the internal ROM 70, for example. That is, the CPU (not shown) of the processor 66 reads the waveform data of each musical instrument from the ROM 70 in accordance with musical script (score) for each musical instrument for playing the BGM (karaoke) set in advance in the same ROM 70 and/or the external ROM 72. Subsequently, the waveform data of each musical instrument read by the CPU is inputted in the sound channels 88, and is outputted as the audio signal (R) and the audio signal (L) from the M sets of sound channels 88 through the above described processes. In a similar manner, the audio signal (R) and the audio signal (L) are also outputted from the M sets of sound channels 88 processing a single audio signal or a mixed audio signal from the amplifier 76.

All of the audio signals (R) outputted from the sound channels 88 are added to each other by an adder 104, and all of the audio signals (L) are added to each other by an accumulator 106. Therefore, each output of the adders 104 and 106 is an aggregate audio signal of the BGM signal (karaoke) and the user's voices (voice). The aggregate audio signal (R) is inputted to a multiplier 108, and the aggregate audio signal (L) is inputted to a multiplier 110. Subsequently, a control signal is given to the multiplier 108 and 110 from a main volume control means 112, that is one of the functions of the CPU of the processor 66. Therefore, the volume-controlled aggregate audio signals (R) (L) are outputted to the audio output terminal 44 shown in FIG. 1 and FIG. 3.

Figure 5:
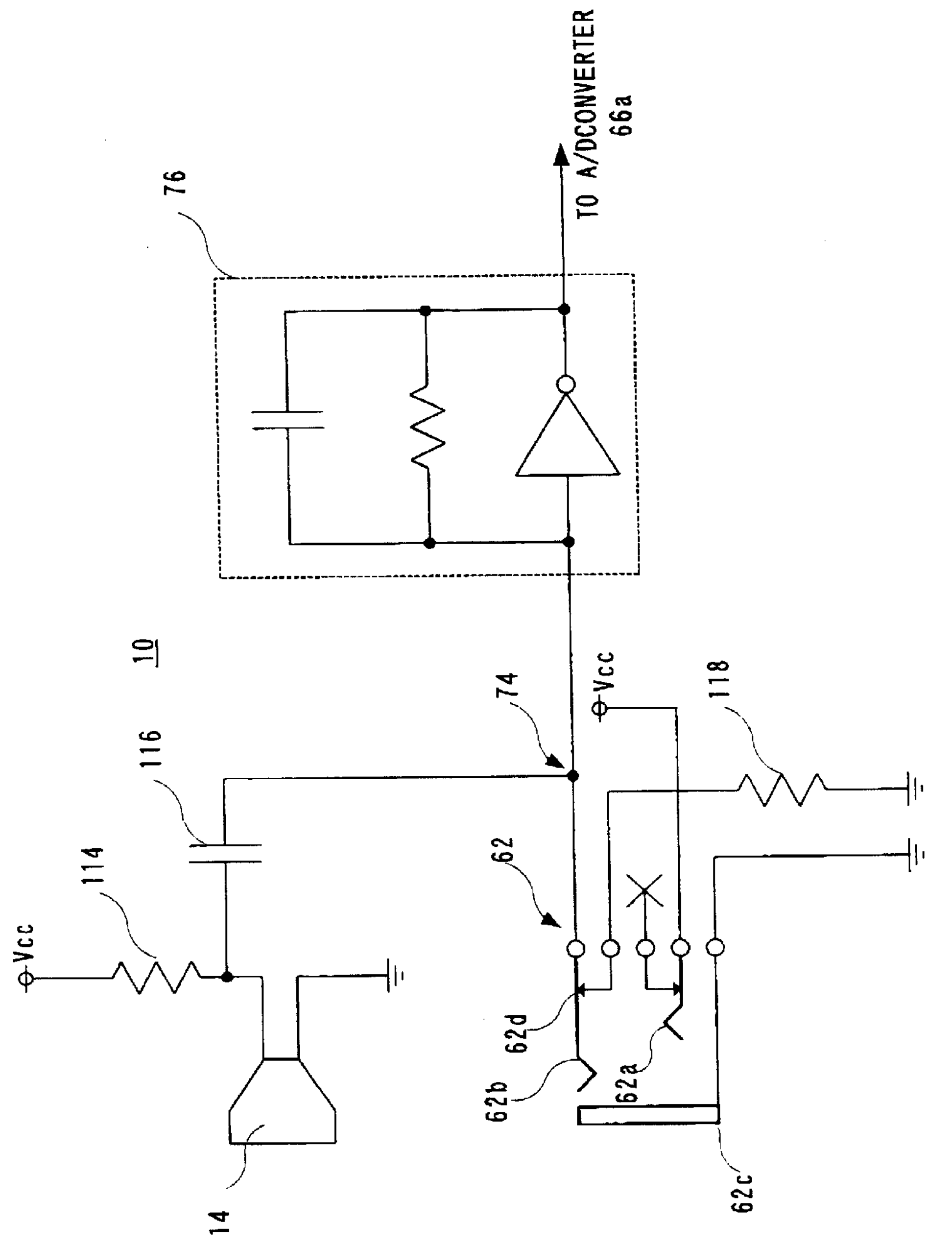
FIG. 5 is a circuit diagram showing microphone-related portions of the karaoke device with built-in microphone.

Next, referring to FIG. 5, the microphone jack 62 of the main body, i.e. the karaoke device with built-in microphone 10 includes two spring terminals 62*a* and 62*b* each of which is a cantilever leaf spring, and one ring terminal 62*c*. The spring terminals 62*a* and 62*b* are a first jack terminal and a second jack terminal respectively, and the ring terminal 62 becomes a third jack terminal. The first jack terminal, i.e. the spring terminal 62*a* receives the constant voltage power Vcc from the constant voltage circuit 82 shown in FIG. 3. Next, the second jack terminal, i.e. the spring terminal 62*b* is connected to the input of the amplifier 76 through the mixer 74. In this embodiment, the mixer 74 is a connecting point. Furthermore, the microphone 14 is a condenser microphone in this embodiment, and the drive voltage is given to the microphone 14 through a resistor 114 from the power Vcc. Then, the output audio signal from the microphone 14 is applied to the connecting point, i.e. the mixer 74 via a DC-cut capacitor 116. In the mixer, i.e. the connecting point 74, the audio signal from the additional microphone 54 inputted through the second jack terminal 62*b* as described later and the audio signal from the main body microphone 14 are mixed in an analog manner. Therefore, in a case that the additional microphone 54 is used, the amplifier 76 becomes to receive the mixed audio signal from more than two microphones as described above.

In addition, although in this embodiment a reverse amplifying circuit utilizing a NOT gate is used for a purpose of cost reduction, it is, of course, obvious that the amplifier 76 may be formed of a conventional operational amplifier.

Furthermore, the microphone jack 62 is provided with a contact point 62*d* which is electrically connected to the spring terminal 62*b* in a normal state, i.e. in a state that the microphone plug 60 is not inserted into the microphone jack 62 and is separated from the spring terminal 62*b* when the microphone plug 60 is inserted. A terminating resistor 118 for the microphone 14 is connected for the microphone 14 between the contact point 62*d* and the ground.

Figure 6:
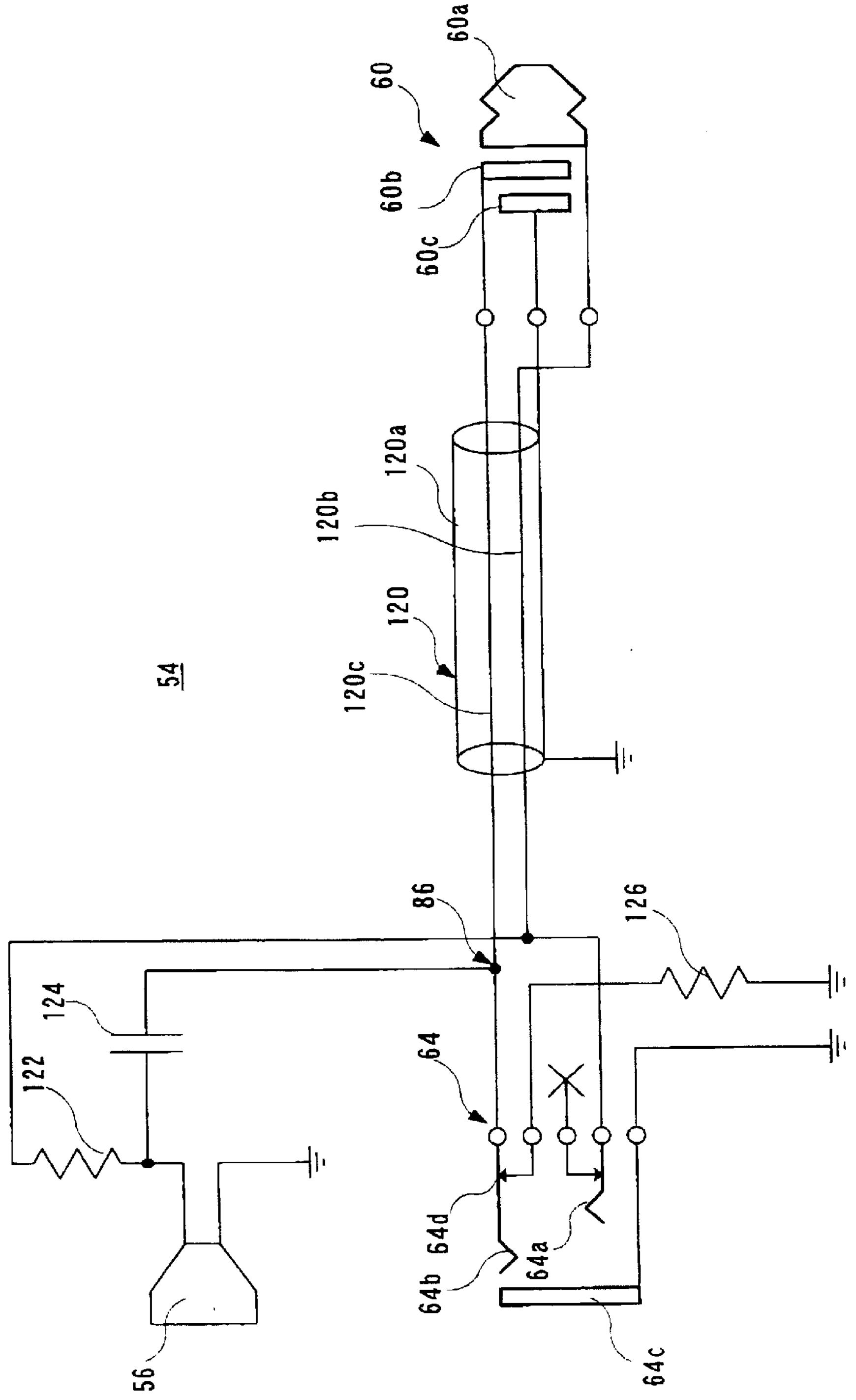
FIG. 6 is a circuit diagram showing an additional microphone.

Furthermore, referring to FIG. 6, the additional microphone 54 (FIG. 2) is shown in detail. The additional microphone 54 has the microphone plug 60 which is inserted into the microphone jack 62 of the main body 10 or to the microphone jack 64 of the further additional microphone 54. The microphone plug 60 has a first, second and third plug terminals 60*a,* 60*b* and 60*c.* The first plug terminal 60*a* is inserted into an inside of the jack 62 through the ring terminal 62*c* of the microphone jack 62 of the main body 10, and is brought into contact with the first terminal 60*a* to be electrically connected thereto. The second plug terminal 60*b* is arranged to rearward of the first plug terminal 60*a,* and is inserted into the jack 62 through the ring terminal 60*c,* and is brought into contact with the second jack terminal 60*b* to be electrically connected thereto. At this time, the second plug terminal 60*b* pushes the second jack terminal 62*b* upward to release an electrical connection between the second jack terminal 62*b* and the contact point 62*d.* Therefore, when the microphone plug 60 is inserted to the microphone jack 62, the terminating resistor 118 (FIG. 5) is released.

The additional microphone 54 also has the microphone jack 64 as similar to the microphone 62 of the main body 10.

The microphone jack 64 includes two spring terminals 64*a* and 64*b* and one ring terminal 64*c*. The spring terminals 64*a* and 64*b* are the first jack terminal and the second jack terminal, respectively, and the ring terminal 64*c* is the third jack terminal. The first jack terminal, namely, the spring terminal 64*a* is connected to the first plug terminal 60*a* of the microphone plug 60 by a line 120*b* of a shield wire 120 shielded by a shield conductor 120*a*. That is, the first jack terminal 64*a* becomes to receive the constant voltage power Vcc from the constant voltage circuit 82 FIG. 3) of the main body 10 through the microphone plug 60, i.e. the first plug terminal 60*a*. Then, the second jack terminal, i.e. the spring terminal 64*a* is connected to the second plug terminal 60*b* by another line 120*c* of the shield wire 120 through the mixer 86. In this embodiment, the mixer 86 is a connecting point.

Furthermore, the microphone 56 is a condenser microphone in this embodiment, and the power Vcc as a drive voltage from the first plug terminal 60*a* is applied to the microphone 56 through a resistor 122. Then, the output audio signal from the microphone 56 is applied to the connecting point, i.e. the mixer 86 via a DC cut capacitor 124. At the mixer, i.e. the connecting point 86, the audio signal from the further additional microphone 54 connected as necessary, being inputted to the microphone plug 60 and the second jack terminal 64*b* of the further additional microphone 54 and the audio signal from the additional microphone 56 are mixed each other.

In addition, the microphone jack 64 is provided with a contact point 64*d* which is electrically connected to the spring terminal 64*b* in a normal state, i.e. in a state that the microphone plug 60 is not inserted into the microphone jack 64, and separated from the spring terminal 64*b* when the microphone plug 60 is inserted. Between the contact point 64*d* and the ground, a terminating resistor 126 for the microphone 56 is connected.

It is noted that the ring terminal, i.e. the third jack terminal 64*c* is connected to the shield conductor 120*a* of the shield wire 12, and the third plug terminal 60*c* is also connected to the shield conductor 120*a*. Then, the shield conductor 120*a* is connected to the ground. That is, inside the additional microphone 54, the third plug terminal 60*c*, the shield conductor 120*a* and the third jack terminal 64*c* are all connected to the ground.

In a case that the additional microphone 54 is connected to the main body 10 as shown in FIG. 2, the microphone plug 60 shown in FIG. 6 is inserted into the microphone jack 62 shown in FIG. 5. Accordingly, the first, the second and the third plug terminals 60*a*, 60*b* and 60*c* are connected to the first, the second and the third jack terminals 62*a*, 62*b* and 62*c*, respectively. At the same time, the second jack terminal 60*b* is pushed up by the second plug terminal 60*b*, and thus the second jack terminal 62*b* and the contact point 62*d* having been connected to each other by this time are separated from each other. Therefore, the terminating resistor 118 of the microphone 14 is released.

Due to a fact that the first plug terminal 60*a* and the first jack terminal 62*a* are connected to each other. the constant voltage power Vcc having been given from the constant voltage circuit 82 (FIG. 3) to the first jack terminal 62*a* is supplied to the terminal 60*a* through the terminal 62*a*, and as shown in FIG. 6 is then supplied to the microphone 56 as the drive power via the resistor 122 by the line 120*b* of the shield wire 120 from the terminal 60*a*.

On the other hand, the audio signal from the main body microphone 14 is given to the mixer 74 through a capacitor 116, and the audio signal from the microphone 56 of the additional microphone 54 is inputted to the second plug terminal 60*b* through the mixer 86 from the capacitor 124. Because the second plug terminal 60*b* is connected to the second jack terminal 60*d* by the line 120*c* of the shield wire 120 as described above, the audio signal from the microphone 56 reaches the mixer 74 of the main body 10 after all. Therefore, the audio signal from the microphone 56 is mixed with the audio signal from the microphone 14, and the mixed audio signal is amplified in the amplifier 76, and is given to the A/D converter 66*a* of the processor 66 and is outputted from the sound channel 88 described in advance in FIG. 4.

In the additional microphone 54, the second jack terminal 64*b* of the microphone jack 64 is still connected to the connecting point 64*d* unless the microphone plug 60 of the further additional microphone 54 is inserted into the microphone jack 64. Therefore, two microphones 14 and 56 are terminated with the terminating resistor 126 (FIG. 6).

In a case that the further additional microphone 54 is further connected to the additional microphone 54 as shown in FIG. 2, the microphone plug 60 of the further additional microphone 54 is inserted into the microphone jack 64 of the additional microphone 54. Therefore, the first, the second and the third plug terminals 60*a*, 60*b* and 60*c* of the further additional microphone 54 are connected to the first, the second and the third jack terminals 64*a*, 64*b* and 64*c* of the additional microphone 54, respectively. At the same time, the second jack terminal 64*b* is pushed up by the second plug terminal 60*b*, and the second jack terminal 64*b* and the connecting point 64*d* having been connected to each other by this time are separated. Therefore, the terminating resistor 126 of the microphone 56 of the additional microphone 64 is opened.

Due to the fact that the first plug terminal 60*a* of another additional microphone 54 and the first jack terminal 64*a* of additional microphone 54 are connected to each other, the constant voltage power Vcc being applied to the first plug terminal 60*a* of the additional microphone 54 is further applied as a drive power to the microphone 56 of the further additional microphone 54 via the resistance 122 from the line 120*b* of the shield wire 120.

The audio signal from the microphone 56 of the additional microphone 54 is given to the mixer 86 through the capacitor 124, and the audio signal from the microphone 56 of the further additional microphone 54 is outputted to the second plug terminal 60*b* through the mixer 86 from the capacitor 124 within the further additional microphone 54. Because the second plug terminal 60*b* of the further additional microphone 54 is connected to the second jack terminal 64*b* of the additional microphone 54, the audio signal from the microphone 56 of the further additional microphone 54 reaches the mixer 86 of the additional microphone 54 in the end. Therefore, the mixed audio signal from the microphone 56 of the two additional microphones 54 is inputted in the mixer 74 of the main body 10, and is then further mixed with the audio signal of the main body microphone 14. The audio signal obtained by mixing the audio signals from three microphones 14, 56 and 56 is amplified in the amplifier 76, and is supplied to the A/D converter 66*a* of the processor 66 and is outputted from the sound channel 88 described in advance in FIG. 4.

In the further additional microphone 54, the second jack terminal 64*b* of the microphone jack 64 is still connected to the contact point 64*d* unless the microphone plug 60 of the further additional microphone 54 is inserted into the microphone jack 64. Therefore, three microphones 14, 56 and 56 are terminated by the terminating resistor 126 (FIG. 6).

Thus, because the microphone jack 64 is provided in the additional microphone 54, it becomes possible to simultaneously use an arbitrary number of microphones only by connecting the microphone plug 60 of the further additional microphone 54 to the microphone jack 64 of the additional microphone 54.

In addition to this, because the drive power of the microphone 56 is supplied from the constant voltage circuit 82 of the main body 10 by through the connection of the microphone jack 62 (or 64) and the microphone 60, there is no need to provide a power supply (battery) in the additional microphone 54. Furthermore, it is possible to terminate all of the microphones by the terminating resistor 126 of the additional microphone 54 to which no further additional microphone is connected.

In addition, it is preferred that respective resistance values of the resistor 114 giving the power to the microphone 14 of the main body 10 and the resistor 122 giving power the microphone 56 of the additional microphone 54 are set at a same value in order to keep the drive voltage of microphones 14 and 56 equal. In a similar manner, the resistance values of the terminating resistors 118 and 126 are preferably the same resistance value.

Figure 7:
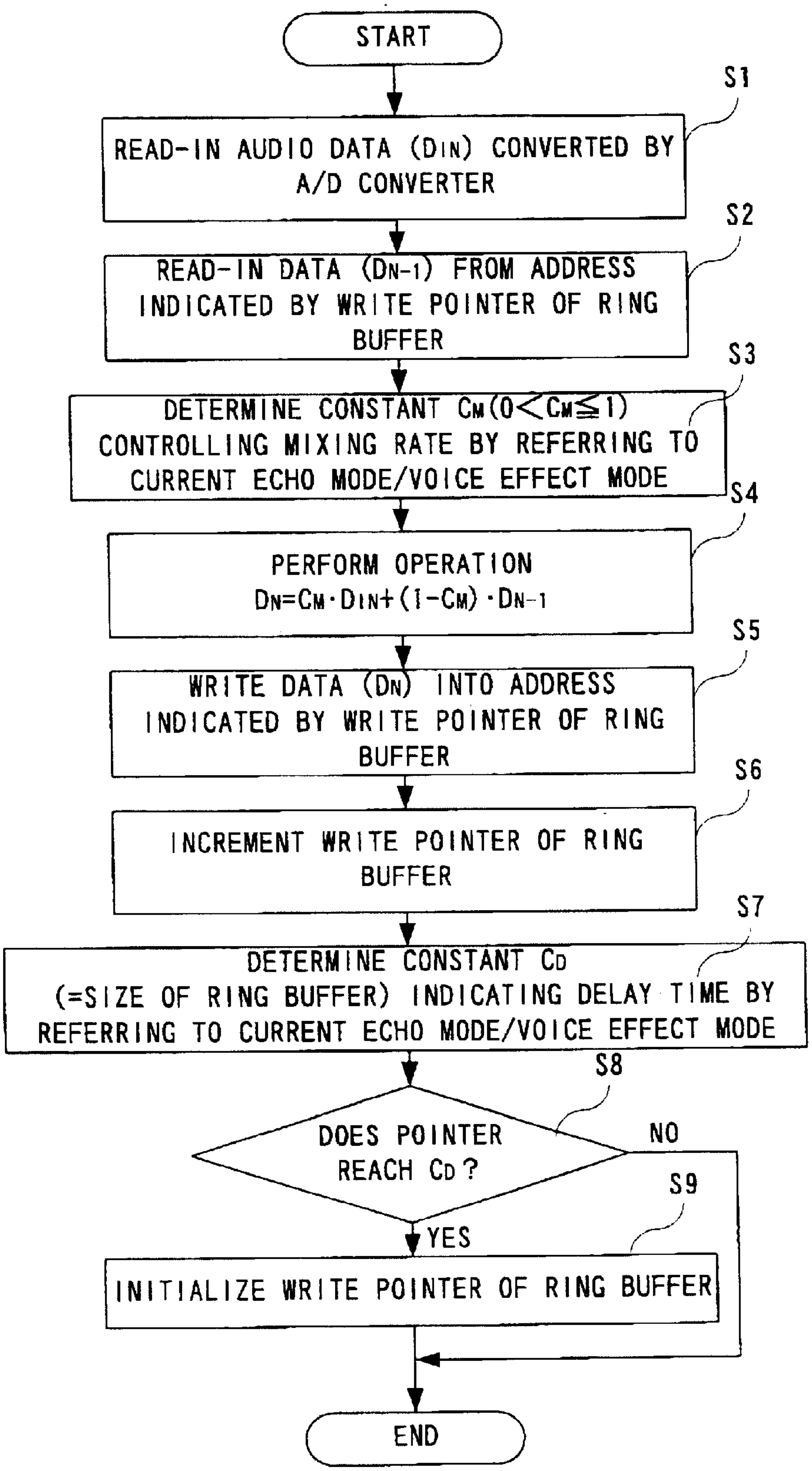
FIG. 7 is a flowchart showing a writing operation of a ring buffer in FIG. 4.

Referring to FIG. 7, an operation for writing the audio data into the ring buffer 66*b* in FIG. 4 is now described. It is pointed out in advance that these operations including FIG. 8 described later is basically performed by the CPU (not shown) of the processor 66.

In a first step S1 the CPU reads-in the audio data ($D_{IN}$) from the A/D converter 66*a*. Then, in a step S2 the previous data ($D_{N-1}$) already stored in the ring buffer 66*d* is read in from the address indicated by the write pointer of the ring buffer 66*b*.

In a step S3 the CPU determines the constant $C_M$ ($0<C_M\leqq 1$) controlling the mixing rate shown in FIG. 9 according to the currently set echo mode and/or voice effect mode. The "mixing rate" means a mixture ratio of the current audio data (sampling data by the A/D converter at this time) and the previous data (data stored in the ring buffer 66*b* prior to the current sampling), and it is possible to modify a weight of both audio data according to the same.

As shown in FIG. 9 in this embodiment, in the echo mode the mixing constant $C_M$ is always set at 0.5, and at 0.75 in the voice effect mode. However, the constant $C_M$ may be set at a different value as required.

In addition, the echo mode 1, echo mode 2 or echo mode 3 is set by the number of times of operations or depresses of the echo mode selection key 34 shown in FIG. 1. For example, if the echo mode selection key 34 is operated only once, the echo mode 1 is set, if operated twice, then the echo mode 2 is set, and if operated three times, then the echo mode 3 is accordingly set. In a similar manner, the voice effect mode 1, voice effect mode 2 or voice effect mode 3 is set by the number of times of operations or depresses of the voice effect mode selection key 36 shown in FIG. 1. For example, if the voice effect mode selection key 36 is operated only once, then the voice effect mode 1 is set, if operated twice, then the voice effect mode 2 is set, and if operated three times, then the voice effect mode 3 is accordingly set.

In FIG. 7 step S4, a weighted addition (mixing) is performed of two data $D_{IN}$ and $D_{N-1}$ by using the following equation in accordance with the constant $C_M$ determined in the step S3.

$$D_N=C_M\cdot D_{IN}+(1-C_M)\cdot D_{N-1}$$

Then, in a step S5 the CPU writes the result operated in the step S4, i.e. the current data $D_N$ in an address indicated by the write pointer of the ring buffer 66*b*. Subsequently, in step S6 the write pointer is incremented.

In a step S7 the constant $C_D$ representing the delay time is determined according to the echo mode and/or the voice effect mode currently set. The delay time correlates with a reverberating time, and is a size of the ring buffer 66*b* in this embodiment. Needless to say that it is noted that in the echo mode the constant $C_D$ is set larger, and is set smaller in the voice effect mode. Furthermore, as to the echo mode 1, 2, and 3, the constant $C_D$ is set small, middle, and large (see FIG. 9).

In a step S8 the CPU determines whether or not the write pointer incremented in the step S6 reaches the constant $C_D$. If "YES" is determined in the step S8, the CPU initializes the write pointer in a following step S9. If "NO", a series of processes regarding the current sampling is terminated. That is, an operation shown in FIG. 7 is executed for on each sampling of the A/D converter 66*a* until "YES" is obtained in the step S8.

In this manner, it is possible to set the reverberating time (delay time) in accordance with the echo mode 1, 2, and 3 by controlling the size of the ring buffer 66*b* by means of the constant $C_D$ when writing the audio data into the ring buffer 66*b*.

Figure 8:
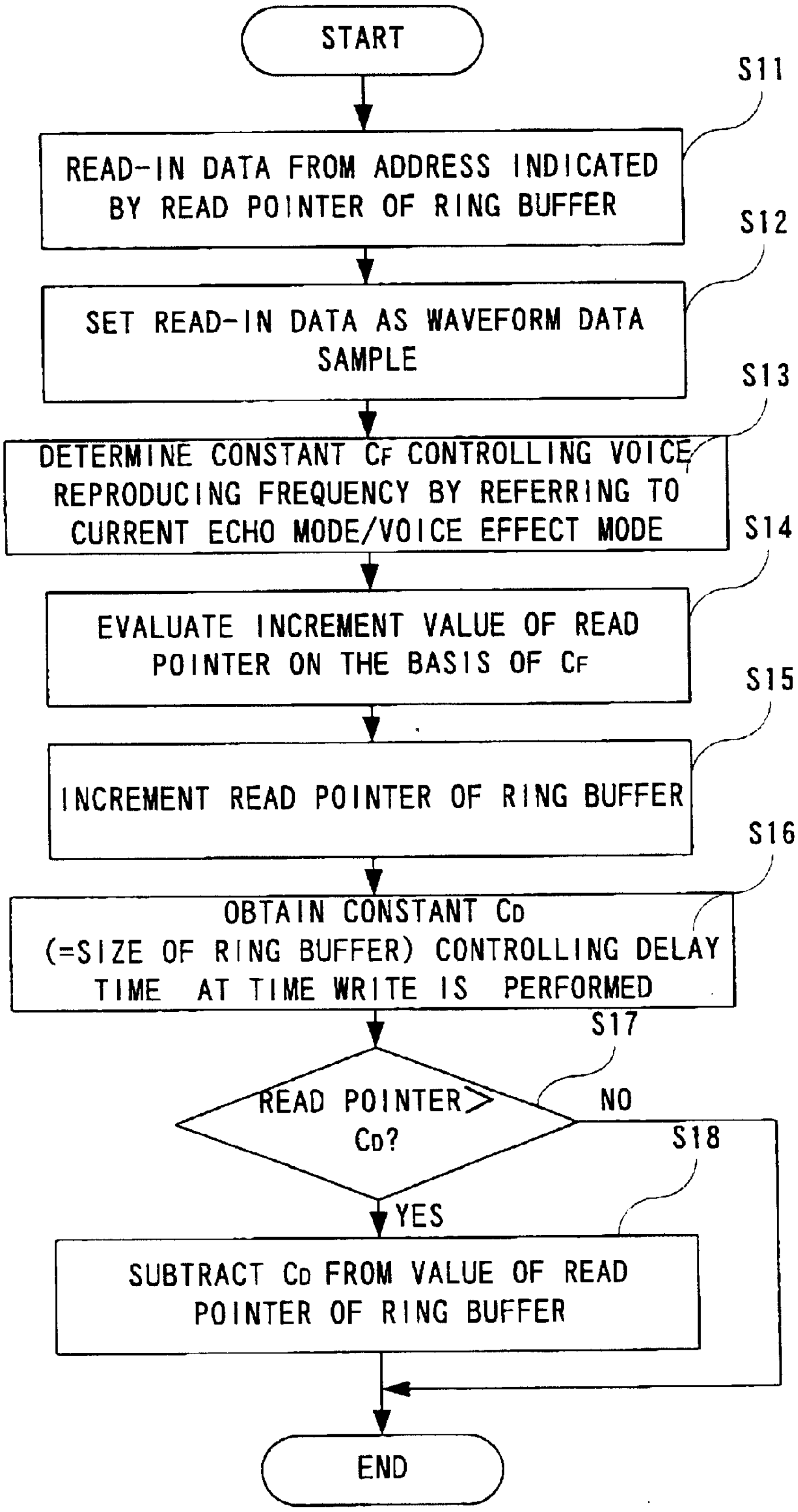
FIG. 8 is a flowchart showing a reading operation of the ring buffer in FIG. 4.

Next, referring to FIG. 8, an operation of reading the audio data from the ring buffer 66*b* in FIG. 4 will be described. In a first step S11, the CPU reads-in the data already stored in the ring buffer 66*b* from the address indicated by the read pointer of the ring buffer 66*b*. Then, in a step S12 the CPU inputs the read data in the D/A converter 90 of the sound channel 70.

In a step S13 the CPU determines the constant $C_F$ controlling the voice producing frequency shown in FIG. 9 according to the echo mode and/or the voice effect mode currently set. The "voice reproducing frequency" is a frequency for frequency-modulating the user's vocal sound (voice). The constant $C_F$ is always set at 1.0 in the echo mode, at 2.0 in the voice effect mode 1, at 0.5 in the voice effect mode 2, and in the voice effect mode 3 at a constant which regularly goes up and down within a range of 0.75 to 1.25 ($0.75\leqq C_F\leqq 1.25$) is set. It is noted that the constant $C_F$ may be set at a different value as required.

In a step S14 an increment value of the read pointer of the ring buffer 66*b* is evaluated on the basis of the constant $C_F$ as determined above, and in a step S15 the read pointer is incremented in accordance with the increment value.

In a step S16 the delay time correlation constant $C_D$ determined in FIG. 7 step 7 is obtained, and in a step S17 the CPU determines whether or not the read pointer reaches the constant $C_D$. If "YES" is determined in the step S17, the CPU subtracts the constant $C_D$ from the read pointer value in a next step S18. If "NO", a series of processes in regards to the current sampling is terminated. That is, the operation shown in FIG. 7 for each sampling of the A/D converter 66*a* is performed until "YES" is obtained in the step S17.

Thus, it becomes possible to modulate the inputted voices with the frequency corresponding to the voice effect mode 1, 2, and 3 by controlling the voice reproducing frequency by the constant $C_F$ when reading the audio data from the ring buffer 66*b*.

The echo and voice effect is described as an example of processing the inputted voices in the above embodiment. However, such processes may include the control or adjustment of other appropriate parameters.

Furthermore, although illustrations of the graphics processor regarding the video signal is omitted in FIG. 4, it is possible to obtain the video signal from the video output terminal 44 to the home-use television, for example by storing the video data in advance in the ROM 72 of the memory cartridge 50 shown in FIG. 3 and processing the video data by the graphics processor. Therefore, the karaoke device with built-in microphone 10 in this embodiment is a karaoke device with audio images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A karaoke device with built-in microphone, comprising:

a body having a microphone;

an A/D converting means which is provided in the body and converts inputted voices from said microphone into audio data;

an audio data processing means which is provided in the body and receives the audio data from the A/D converter and processes the audio data to apply voice effect to the voices and to output processed audio data; and an audio signal outputting means which is provided in the body and outputs an audio signal on the basis of the processed audio data.

2. A karaoke device with built-in microphone according to claim 1, wherein said voice effect includes a first mode for processing voices so as to raise a frequency of output voices with respect to a frequency of input voices, a second mode for processing voices so as to lower a frequency of output voices with respect to a frequency of input voices, and a third mode for processing voices so as to repeatedly change (sweep) a frequency of output voices continuously upward and downward.

3. A karaoke device with built-in microphone comprising:

a body having a microphone;

an A/D converting means which is provided in the body and converts inputted voices from said microphone into audio data;

an audio data processing means which is provided in the body and receives the audio data from the A/D converter and processes the audio data to output processed audio data; and an audio signal outputting means which is provided in the body and outputs an audio signal on the basis of the processed audio data, wherein the audio data processing means includes a ring buffer for storing the audio data from the A/D converting means; a writing means for writing the audio data into the ring buffer; and a reading means for reading the audio data from the ring buffer.

4. A karaoke device with built-in microphone according to claim 3, further comprising an echo mode setting key provided on the body to set an echo mode, wherein the writing means includes a first setting means to set a size of the ring buffer in response to the echo mode.

5. A karaoke device with built-in microphone according to claim 3 or 4, further comprising a voice effect mode setting key provided on the body to set a voice effect mode, wherein the reading means includes a second setting means to set a ring buffer read pointer in response to said voice effect mode.

* * * * *